US007916127B2

(12) United States Patent
Wang

(10) Patent No.: US 7,916,127 B2
(45) Date of Patent: Mar. 29, 2011

(54) METHOD AND CIRCUITRY FOR SELF TESTING OF CONNECTIVITY OF TOUCH SCREEN PANEL

(75) Inventor: Ing-Yih Wang, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 1125 days.

(21) Appl. No.: 11/646,778

(22) Filed: Dec. 28, 2006

(65) Prior Publication Data

US 2007/0200831 A1 Aug. 30, 2007

Related U.S. Application Data

(60) Provisional application No. 60/777,386, filed on Feb. 27, 2006.

(51) Int. Cl.
*G06F 3/045* (2006.01)

(52) U.S. Cl. .................. 345/174; 178/18.01; 178/18.05

(58) Field of Classification Search .......... 345/173–178; 178/20.01–20.04, 18.01–18.11
See application file for complete search history.

(56) References Cited

U.S. PATENT DOCUMENTS

| | | | |
|---|---|---|---|
| 4,928,094 A | 5/1990 | Smith | |
| 5,335,230 A * | 8/1994 | Crooks et al. | 714/48 |
| 6,246,394 B1 * | 6/2001 | Kalthoff et al. | 345/173 |
| 6,738,048 B1 | 5/2004 | Rundel | 345/173 |
| 6,765,558 B1 * | 7/2004 | Dotson | 345/173 |
| 2005/0172254 A1 | 8/2005 | Watanabe et al. | |
| 2006/0071911 A1 * | 4/2006 | Sullivan | 345/173 |

* cited by examiner

*Primary Examiner* — Amr Awad
*Assistant Examiner* — Stephen A Bray
(74) *Attorney, Agent, or Firm* — John J. Patti; Wade J. Brady, III; Frederick J. Telecky, Jr.

(57) ABSTRACT

A touch screen digitizing system includes a first resistive screen and a touch screen controller including an ADC and self-test circuitry having a driver switch coupled between a reference voltage and a first terminal of the first resistive screen, and a first test switch coupled between ground and a conductor connected to generate a first test voltage on the conductor indicative of connection resistance between the first resistive screen and the touch screen controller. Another test switch couples the test voltage to an input of the ADC. An output of the ADC is compared with a reference to determine whether the connection resistance is excessive. Connection resistance between a second resistive screen and the touch screen controller is measured similarly. Similar self-test circuitry operates to detect a short circuit between the first resistive screen and the second resistive screen.

7 Claims, 3 Drawing Sheets

1A
1
TOUCH SCREEN
CONTROLLER
(TSC)
VCC
VCC
18
20
24
15
x+
y+
26
y+
31
y+
x+
DOUT
CS
CLK
22
16
+IN
+REF
ADC
CONTROL
41
-IN
-REF
x-
x+
42
27
CONTROL
DATA
y-
30
y-
x-
25
17
19
21

VCC
32B
ytest +
S0
20

26
Rcy
35
y+
6A
Rtsy
6B
31
22
y-
yts-
S1
+IN
VREF +
ADC
-IN
VREF -
DOUT
25
28y
TESTy
34
21
ytest-
S2
36

10
10A
TOUCH SCREEN CONTROLLER (TSC)
SERIAL TOUCH SCREEN DATA OUT
PASS/FAIL NOTIFY/ INTERRUPT
A<B="0" (FAIL)
A≥B=>"1" (PASS)
TEST BITS
TEMPORARY REGISTERS
41A
CONTROL UNIT
CS
CLK
CONTROL DATA
PASS/ FAIL
ADC
+IN
-IN
$+V_{ref}$
$-V_{ref}$
$D_{out}$
S0
S1
S2
$V_{CC}$
$x_{test}+$
$y_{test}+$
$y_{test}-$
$x_{test}-$
$x_{ts}-$
$y_{ts}-$
$R_{cx}$
$R_{cy}$
$R_{tsx}$
$R_{tsy}$
TESTx
TESTy
x+
y+
x-
y-
Q
7A
6A
7B
6B

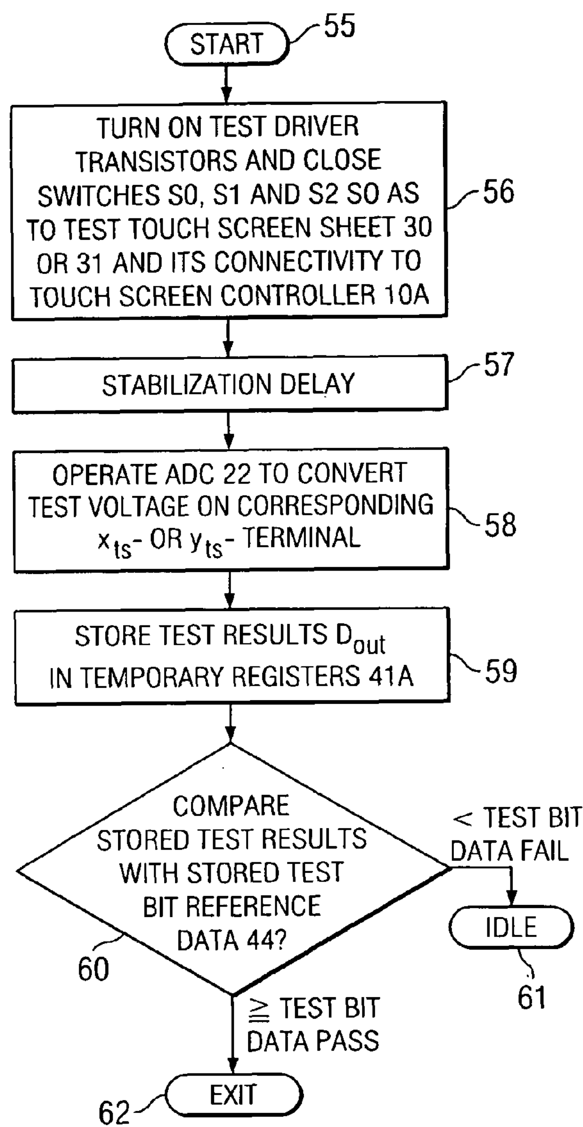
FIG. 4
START
55
TURN ON TEST DRIVER TRANSISTORS AND CLOSE SWITCHES S0, S1 AND S2 SO AS TO TEST TOUCH SCREEN SHEET 30 OR 31 AND ITS CONNECTIVITY TO TOUCH SCREEN CONTROLLER 10A
56
STABILIZATION DELAY
57
OPERATE ADC 22 TO CONVERT TEST VOLTAGE ON CORRESPONDING $x_{ts}$- OR $y_{ts}$- TERMINAL
58
STORE TEST RESULTS $D_{out}$ IN TEMPORARY REGISTERS 41A
59
COMPARE STORED TEST RESULTS WITH STORED TEST BIT REFERENCE DATA 44?
60
< TEST BIT DATA FAIL
IDLE
61
≥ TEST BIT DATA PASS
EXIT
62

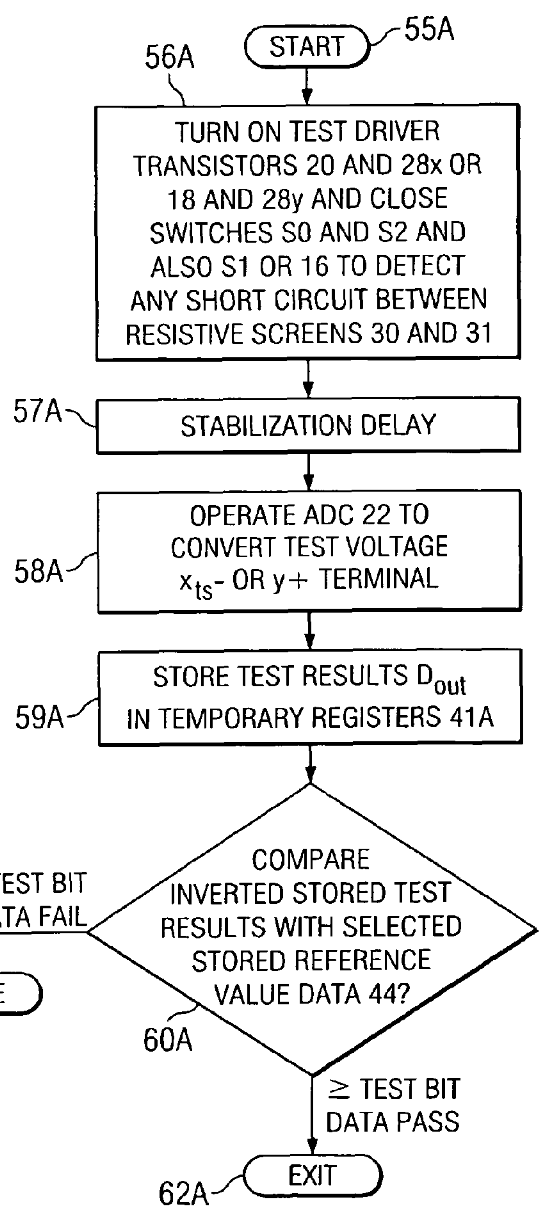
FIG. 5
START
55A
56A
TURN ON TEST DRIVER TRANSISTORS 20 AND 28x OR 18 AND 28y AND CLOSE SWITCHES S0 AND S2 AND ALSO S1 OR 16 TO DETECT ANY SHORT CIRCUIT BETWEEN RESISTIVE SCREENS 30 AND 31
57A
STABILIZATION DELAY
58A
OPERATE ADC 22 TO CONVERT TEST VOLTAGE $x_{ts}$- OR y+ TERMINAL
59A
STORE TEST RESULTS $D_{out}$ IN TEMPORARY REGISTERS 41A
COMPARE INVERTED STORED TEST RESULTS WITH SELECTED STORED REFERENCE VALUE DATA 44?
60A
< TEST BIT DATA FAIL
IDLE
61A
≥ TEST BIT DATA PASS
EXIT
62A

METHOD AND CIRCUITRY FOR SELF TESTING OF CONNECTIVITY OF TOUCH SCREEN PANEL

CROSS REFERENCE TO RELATED APPLICATION

This application claims the benefit of prior filed co-pending U.S. provisional application Ser. No. 60/777,386 filed Feb. 27, 2006, entitled "Self Test Scheme of Touch Screen Connectivity for TSC2004/2005", by James Wang (whose legal name is Ing-Yih Wang) and incorporated herein by reference.

BACKGROUND OF THE INVENTION

The invention relates to resistive touch screen systems including a resistive touch screen assembly and an ADC (analog-to-digital converter) for digitizing x and y coordinates of touch points at which touch pressure is being applied to the resistive touch screen assembly, and more particularly to circuitry and an automatic self-test method for avoiding the need to provide external circuitry and testing steps to determine if there is adequate connectivity of the resistive touch screen assembly to a touch screen controller chip and also to determine if there is a short circuit in the resistive touch screen assembly.

The closest prior art is believed to include commonly assigned U.S. Pat. No. 6,246,394 entitled "Touch Screen Measurement Circuit and Method" issued Jun. 12, 2001 to Kalthoff et al., incorporated herein by reference. Also, commonly assigned U.S. Pat. No. 6,738,048 entitled "Touch Screen Controller" issued May 18, 2004 to Bernd M. Rundel, also incorporated herein by reference, is indicative of the state of the art.

As shown in "Prior Art" FIG. 1 herein, the '394 patent discloses a touch screen digitizing system which includes a touch screen unit or assembly 30,31 including a first resistive screen 30 with opposed x+ and x− terminals, a second resistive screen 31 with opposed y+ and y− terminals, and an ADC 22 having first and second reference input terminals 35 and 36, respectively. The various terminals of touch screen assembly 30,31 are connected to corresponding terminals of a touch screen controller (TSC) chip 1A including a first switch 19 which is coupled between a first reference voltage (ground) and the x− terminal, and a second switch 18 which is coupled between the x+ terminal and a second reference voltage $+V_{CC}$ for energizing the first resistive screen 30. A third switch 21 is coupled between ground and the y− terminal, and a fourth switch 20 is coupled between the y+ terminal and $V_{CC}$ for energizing the second resistive screen 31. Switching circuitry 5,17 couples an input of the ADC 22 to the y+ terminal while the first resistive screen 30 is energized and the second resistive screen 31 is not energized, and also couples the input to the x+ terminal while the second resistive screen 31 is energized and the first resistive screen 30 is not energized. More specifically, the various terminals of the resistive screens 30 and 31 are connected to the drains of the various corresponding driver transistors 18, 19, 20 and 21. The structure provides continuous calibration of the full-scale analog touch screen output of the full-scale digital output of the ADC 22 irrespective of sharply different variations that may occur in resistances of the switches and resistive screens.

As a practical matter, the above mentioned connections between touch screen assembly 30,31 and the touch screen controller chip 1A have a wide range of connection resistances which may vary from as little as a few ohms to as much as a few megohms, depending upon the condition and reliability of each connection. The wide range of connection resistances typically is caused by solder connection failures or manufacturing defects in connectors. Also, zero-touch-point-pressure short circuits may occur between the resistive screens such as 30 and 31 due to warping caused by material fatigue of one or both resistive screens or manufacturing defects. In the past, testing for adequate touch screen connectivity to the TSC chip 1A and testing for short circuits in the touch screen assembly 30,31 has been performed manually by the user, wherein multiple manual touches at different touch points of the touch screen assembly 30,31 are required to detect failed connections between the touch screen assembly 30,31 and the TSC chip 1A. The foregoing manual testing has resulted in substantial additional cost.

There is an unmet need for a way to conveniently and automatically determine whether or not the touch screen assembly is adequately connected to the driver transistors in the touch screen control chip, despite the wide range of the touch screen panel resistance and the wide range of connection resistance between the resistive screens and the touch screen controller chip.

There also is an unmet need for a way to conveniently and automatically determine whether or not there is a short circuit between resistive screens of the touch screen assembly caused, for example, by warping of one or both of the resistive screens or by manufacturing defects.

There also is an unmet need for a way to avoid the high costs of testing touch screen assemblies in touch screen systems of the prior art.

SUMMARY OF THE INVENTION

It is an object of the invention to provide a way to conveniently and automatically determine whether or not the touch screen assembly is adequately connected to the driver transistors in the touch screen control chip, despite the wide range of the touch screen panel resistance and the wide range of connection resistance between the resistive screens and the touch screen controller chip.

It is another object of the invention to provide a way to conveniently and automatically determine whether or not there is a short circuit between resistive screens of the touch screen assembly caused, for example, by warping of one or both of the resistive screens or by manufacturing defects.

It is another object of the invention to provide a way to avoid the high costs of testing touch screen assemblies in touch screen systems of the prior art.

Briefly described, and in accordance with one embodiment, the present invention provides a touch screen digitizing system includes a first resistive screen (30) and a touch screen controller including an ADC and self-test circuitry having a driver switch (18) coupled between a reference voltage and a first terminal of the first resistive screen, and a first test switch (28*x*) coupled between ground and a conductor connected to generate a first test voltage ($x_{ts}^-$) on the conductor indicative of connection resistance between the first resistive screen and the touch screen controller. Another test switch (S1) couples the test voltage to an input of the ADC. An output of the ADC is compared with a reference to determine whether the connection resistance is excessive. Connection resistance between a second resistive screen (31) and the touch screen controller is measured similarly. Similar self-test circuitry operates to detect a short circuit between the first resistive screen and the second resistive screen.

In one embodiment, the invention provides a touch screen digitizing system (10) including a touch screen assembly (30,31) having a first resistive screen (30) with opposed first ($x^+$) and second ($x^-$) terminals and a second resistive screen (31) with opposed third ($y^+$) and fourth ($y^-$) terminals, and a touch screen controller circuit (10A) including an analog-to-digital converter (22) having first ($V_{REF}^+$) and second ($V_{REF}^-$) reference terminals. Self-test circuitry is provided which includes a first driver switch (18) coupled between a first reference voltage ($V_{CC}$) and the first terminal ($y^+$), and a first test switch (28$x$ ) coupled between a second reference voltage (GND) and a first conductor (27) connected to the second terminal ($x^-$) for energizing the first resistive screen (30) to generate a first test voltage ($x_{ts}^-$) on the first conductor (27) indicative of an amount of a first lumped connection resistance (Rcx) between corresponding connection pads (7A,7B) connecting the first resistive screen (30) and the touch screen controller circuit (10A). A second driver switch (20) coupled between the first reference voltage ($V_{CC}$) and the third terminal ($y^+$), and a second test switch (28$y$) is coupled between the second reference voltage (GND) and a second conductor (25) is connected to the fourth terminal ($y^-$) for energizing the second resistive screen (31) to generate a second test voltage ($y_{ts}^-$) on the second conductor (25) indicative of an amount of a second lumped connection resistance (Rcy) between corresponding connection pads (6A,6B) connecting the second resistive screen (31) and the touch screen controller circuit (10A). A third test switch (S0) having a first terminal is coupled to the first reference voltage ($V_{CC}$) and a second terminal is coupled to the first reference terminal ($V_{REF}^+$) of the analog-to-digital converter (22), and a fourth test switch (S2) having a first terminal is coupled to the second reference voltage (GND) and a second terminal is coupled to the second reference terminal ($V_{REF}^-$) of the analog-to-digital converter (22). A fifth test switch (S1) has a first terminal connected to the first conductor (27), a second terminal connected to the second conductor (25), and a third terminal coupled to a first input of the analog-to-digital converter (22) for selectively coupling the first ($x_{ts}^-$) or second ($y_{ts}^-$) test voltage to the first input of the analog-to-digital converter (22). A comparator (40) has a first input (A) coupled to receive an output (34A) of the analog-to-digital converter (22) representative of one of the first ($x_{ts}^-$) and second ($y_{ts}^-$) test voltages and a second input (B) coupled to receive a first predetermined reference signal for producing a first pass/fail signal indicative of whether the first (Rcx) or second (Rcy) lumped connection resistance is excessive relative to a maximum resistance (Rtsx) of the first resistive screen (30) or a maximum resistance (Rtsy) of the second resistive screen (31), respectively.

In one embodiment, the second driver switch (20) and the first test switch (28$x$) are both turned on, a third test voltage ($x_{ts}^-$) is generated on the first conductor (27) indicative of whether or not there is a short circuit between the first (30) and second (31) resistive screens, and the fifth test switch (S1) is controlled to couple the third test voltage ($x_{ts}^-$) to the first input of the analog-to-digital converter (22), and the second input (B) of the comparator (40) receives a second predetermined reference signal wherein the comparator (40) produces a second pass/fail signal indicative of the presence of any short circuit between the first (30) and second (31) resistive screens.

In the described embodiments, a control unit (41) controls the performing of a self-test operation on the touch screen digitizing system (10) while a normal touch screen digitizing operation is disabled. The control unit (41) includes register circuitry (41A) coupled to the output (34) of the analog-to-digital converter (22) for temporarily storing information representative of the one of the first ($x_{ts}^-$) and second ($y_{ts}^-$) test voltages, wherein the register circuitry (41A) provides the information representative of the one of the first ($x_{ts}^-$) and second ($y_{ts}^-$) test voltages to the first input (A) of the comparator (40). The register circuitry (41A) is coupled to an output (46) of the comparator (40) and stores the first pass/fail signal. The register circuitry (41 A) temporarily stores information representative of coordinates of a touch point (Q) during normal touch screen digitizing operation and provides the information representative of the coordinates of the touch point (Q) in serial-format to a coordinate data output (47) of the touch screen controller (10A).

In the described embodiment, the first driver switch (18) and the second driver switch (20) include N-channel transistors and the first test switch (28$x$) and second test switch (28$y$) are P-channel transistors. The third test switch (S0), fourth test switch (S2), and fifth test switch (S1) each include a double-throw, single-poll switch. The first predetermined reference signal is selectable by a user from a plurality of reference signals stored in a reference signal memory (44).

In the described embodiment, the comparator (40) is a digital comparator, wherein the first input (A) is a multi-bit digital signal and wherein the second input (B) is a multi-bit digital signal. The first pass/fail signal produced by the comparator (40) represents a pass condition if the value of the one of the first ($x_{ts}^-$) and second ($y_{ts}^-$) test voltages exceeds the value of the first predetermined reference signal (39). The control unit (41) automatically begins normal touch screen digitizing operation after a value of the first pass/fail signal indicative of a pass condition has been generated. The control unit (41) automatically enters an idle condition which prevents normal touch screen digitizing operation after a value of the first pass/fail signal indicative of a fail condition has been generated.

In one embodiment, the invention provides a method of self-testing a touch screen digitizing system including a touch screen assembly (30,31) including a first resistive screen (30) with opposed first ($x^+$) and second ($x^-$) terminals and a second resistive screen (31) with opposed third ($y^+$) and fourth ($y^-$) terminals, and a touch screen controller circuit (10A) including an analog-to-digital converter (22) having first ($V_{REF}^+$) and second ($V_{REF}^-$) reference terminals, the method including closing a first driver switch (18) coupled between a first reference voltage ($V_{CC}$) and the first terminal ($x^+$), and closing a first test switch (28$x$) coupled between a second reference voltage (GND) and a first conductor (27) connected to the second terminal ($x^-$) to energize the first resistive screen (30) to generate a first test voltage ($x_{ts}^-$) on the first conductor (27) indicative of an amount of a first lumped connection resistance (Rcx) between corresponding connection pads (7A,7B) connecting the first resistive screen (30) and the touch screen controller circuit (10A), coupling the first reference terminal ($V_{REF}^+$) of the analog-to-digital converter (22) to the first reference voltage ($V_{CC}$) and coupling the second reference terminal ($V_{REF}^-$) of the analog-to-digital converter (22) to the second reference voltage (GND), selectively coupling the first ($x_{ts}^-$) test voltage to an input of the analog-to-digital converter (22), and comparing an output signal (34) produced by the analog-to-digital converter (22) representative of the first test voltage ($x_{ts}^-$) with a first predetermined reference signal by means of a comparator (40) to produce a first pass/fail signal indicative of whether the first lumped connection resistance (Rcx) is excessive relative to a maximum resistance (Rtsx) of the first resistive screen (30). The method includes closing a second driver switch (20) coupled between the first reference voltage ($V_{CC}$) and the third terminal ($y^+$), and closing a second test switch (28$y$) coupled between the second reference voltage (GND) and a second conductor (25) connected to the fourth terminal ($y^-$) to energize the second resistive screen (31) to generate a second test voltage ($y_{ts}^-$) on the second conductor (25) indicative of an amount of a second lumped connection resistance (Rcy) between corresponding connection pads (6A,6B) connecting the second resistive screen (31) and the touch screen controller circuit (10A), selectively coupling the second ($y_{ts}^-$) test voltage to the input of the analog-to-digital converter (22), and comparing another output signal (34) produced by the analog-to-digital converter (22) representative of the second test voltage ($y_{ts}^-$) with the first predetermined reference signal by means of the comparator (40) to produce a second pass/fail signal indicative of whether the second lumped connection resistance (Rcy) is excessive relative to a maximum resistance (Rtsy) of the second resistive screen (31).

In one embodiment, the invention provides a touch screen digitizing system (10) including a touch screen assembly (30,31) including a first resistive screen (30) with opposed first ($x^+$) and second ($x^-$) terminals and a second resistive screen (31) with opposed third ($y^+$) and fourth ($y^-$) terminals, and a touch screen controller circuit (10A) including an analog-to-digital converter (22) having first ($V_{REF}^+$) and second ($V_{REF}^-$) reference terminals, and self-test circuitry including a first driver switch (20) coupled between a first reference voltage ($V_{CC}$) and the first terminal ($x^+$), and a first test switch (28*x*) coupled between a second reference voltage (GND) and a first conductor (27) connected to the second terminal ($x^-$) to generate a test voltage ($x_{ts}^-$) on the first conductor (27) indicative of the presence of any short circuit connection between the first (30) and second (31) resistive screens. Means are provided for coupling the first reference voltage ($V_{CC}$) to the first reference terminal ($V_{REF}^+$) of the analog-to-digital converter (22), and means are provided for coupling the second reference voltage (GND) to the second reference terminal ($V_{REF}^-$) of the analog-to-digital converter (22). A second test switch (S1) has a first terminal connected to the first conductor (27) and a second terminal coupled to an input of the analog-to-digital converter (22) for coupling the test voltage ($x_{ts}^-$) to the input of the analog-to-digital converter (22). A comparator (40) has a first input (A) coupled to receive a signal (34A) representative of an output (34) of the analog-to-digital converter (22) representative of the test voltage ($x_{ts}^-$) and a second input (B) coupled to receive a predetermined reference signal (39) for producing a pass/fail signal indicative of whether or not a snort circuit exists between the first (30) and second (31) resistive screens. The first input (A) of the comparator (40) may receive a logical complement of the output of the analog-to-digital converter (22) representative of the test voltage ($x_{ts}^-$).

BRIEF DESCRIPTION OF THE DRAWINGS

FIG. 4 is a flow chart of a self-test algorithm executed to test for excessive connection resistance in accordance with the embodiments of FIGS. 2 and 3.

FIG. 5 is a flow chart of a self-test algorithm executed to test for short circuits between resistive screens in accordance with the embodiments of FIGS. 2 and 3.

DETAILED DESCRIPTION OF THE PREFERRED EMBODIMENTS

In accordance with the present invention, a self-test algorithm and associated logic circuitry are further implemented within the TSC (touch screen controller) chip 1A shown in Prior Art FIG. 1 so as to provide an improved TSC chip 10A shown in subsequently described FIG. 3, wherein a self-test algorithm according to the flowchart of FIG. 4 and/or a self-test algorithm according to the flowchart of FIG. 5 is automatically executed in TSC chip 10A. The adequacy of the connections between the touch screen assembly 30,31 and the TSC chip 10A, and also the presence of any short circuits in the touch screen assembly 30, 31, can be thereby automatically detected within TSC chip 10A during manufacture and before normal operation of the touch screen system 10 in FIG. 3 begins.

Figure 1:
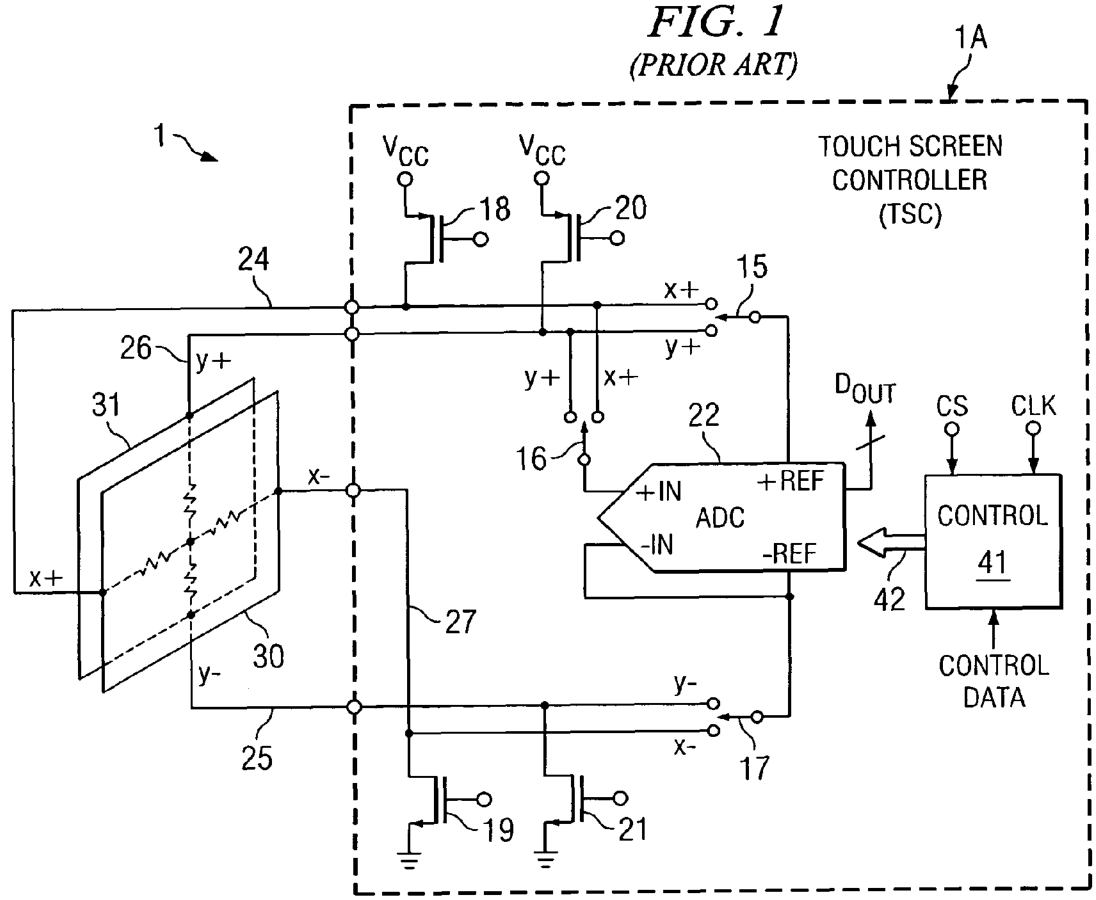
FIG. 1 is a schematic diagram which is similar to FIG. 1 of prior art U.S. Pat. No. 6,246,394.
Figure 2:
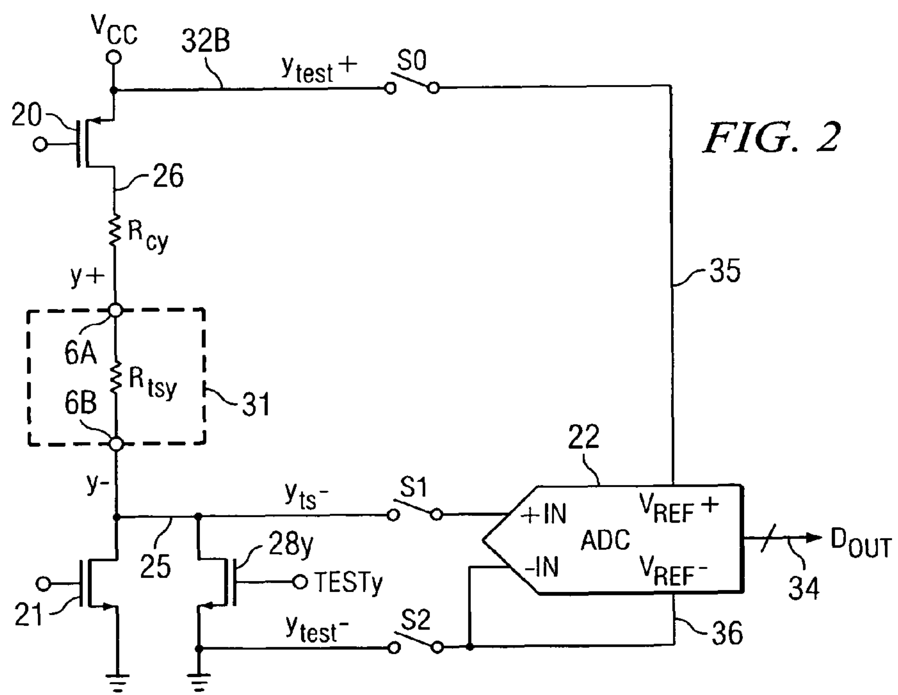
FIG. 2 is a simplified schematic diagram useful in explaining the basic structure and operation of the present invention.

FIG. 2 is a simplified schematic diagram for the purpose of further describing the basic structure and technique of the present invention. In FIG. 2, only the portion of the circuitry associated with energizing and self-testing of the "y" resistive screen 31 of touch screen assembly 30,31 of Prior Art FIG. 1 is shown. Connection resistance Rcy represents the total lumped terminal connection resistance between "y" resistive screen 31 and corresponding terminals of TSC chip 10A. Rcy could range from a few ohms to a few megohms, depending on the condition of the connection.

The resistance Rtsy represents the entire screen resistance in the "y" direction across resistive screen 31. The upper connection pad 6A of the total or maximum screen resistance Rtsy is coupled to the drain of P-channel driver transistor 20, the source of which is connected to $+V_{CC}$. The lower connection pad 6B of the maximum screen resistance Rtsy is coupled to the drain of N-channel driver transistor 21, the source of which is connected to ground. A N-channel test transistor 28*y* is coupled between the lower connection pad 6B of resistance Rtsy and ground, and the gate of test transistor 28*y* is coupled to an internally generated test signal TESTy. Test transistor 28*y* has a resistance which is much greater (e.g., 96 times greater) than the resistance of N-channel driver transistor 21. The source of P-channel driver transistor 20 and $+V_{CC}$ are both connected by conductor 32B to one terminal of a switch S0, one terminal of which is connected by conductor 35 to the $V_{REF}^+$ reference terminal of ADC 22. The drain of N-channel transistor 21 is connected by conductor 25 to one terminal of a switch S1, the other terminal of which is connected to the (+) input of ADC 22. The source of test transistor 28*y* and ground are connected to one terminal of a switch S2, the other terminal of which is connected to the $V_{REF}^-$ reference terminal of ADC 22. The gate voltages of driver transistors 20 and 21 are controlled as described in above mentioned U.S. Pat. No. 6,246,394 during normal operation of the touch screen system described therein, and also shown in present Prior Art FIG. 1. (The circuitry for self-testing of x screen 30 in subsequently described FIG. 3 is essentially similar to the circuitry for self-test of y screen 31.)

The simplified circuitry in FIG. 2 thus includes a resistive voltage divider from the screen resistance Rtsy of the touch screen and the connection resistance Rcy that allows the voltage on conductor 25 to be measured by ADC 22. The maximum screen resistance Rtsy is within a particular range for a particular touch screen product. The measured value of self-test voltage $y_{ts}^-$ on conductor 25 thus depends on the touch screen panel resistance Rtsy (or Rtsx in subsequently described FIG. 3) and the connection pad resistance Rcy). The touch screen resistance Rtsy (or Rtsx) varies within a range for different touch screen vendors, and the technique of the present invention can test various touch screens from different vendors using different reference voltages with which the self-test voltage $y_{ts}^-$ is to be compared.

Poor connectivity of screen 31 to driver transistors 20 and 21 reduces the accuracy of the analog to digital conversion of the coordinates conversion of any touch point Q in the touch screen system of Prior Art FIG. 1. The self-test method of the present invention deals with this problem automatically and economically by also using the existing ADC 22 and test driver transistors 20 and 21 for making test voltage measurements at the drain of test transistor 28*y* when it is turned on by the internally generated signal TESTy and driver transistor 20 is turned on by an internally generated gate control signal. The measured test voltages are converted to binary numbers by ADC 22. The binary numbers then are compared with a user-selected binary reference number to determine whether the measured test voltages exceed a reference voltage represented by the binary reference number. The steps are performed by an internal control unit that provides a "pass/fail" signal to indicate that the product has passed the test when the self-test measurement of the voltage $y_{ts}^-$ is larger than the reference voltage represented by the binary test bits.

The basic foregoing structure and technique results in testing of the voltage $y_{ts}^-$ generated by the current passing to ground through driver transistor 20, lumped connection resistance Rcy, total touch screen resistance Rtsy, and test transistor 28*y*. Therefore, the following equation describes the voltage of $y_{ts}^-$ being measured by ADC 22:

$$y_{ts^-} = \frac{1024}{Rtsy + Rcy + R_{28y}} \times R_{28y}. \qquad \text{Equation (1)}$$

The number $1024=2^{10}$ in the numerator of Equation (1) corresponds to the fact that for a 10-bit converter, the value of one LSB (least significant bit) is equal to ($V_{CC}$–GND)/1024 volts. For Rtsy=5 kilohms and $R_{28y}$=5×96=480 ohms, and Rcy=0, then, if ADC 22 is a 10-bit converter, the measured voltage $y_{ts}^-$ can be approximated as:

$$y_{ts^-} = \frac{1024}{5k\Omega + 480\Omega} \times 480\Omega \approx 90LSB. \qquad \text{Equation (2)}$$

That is within the range of $2^7-1$ to $2^6$ LSB (least significant bits) for a 10-bit converter. Therefore, a test Bit 4 of ADC 22 can be designated as a "flag" of adequate connectivity of y screen 31 to driver transistors 20 and 21 and test transistor 28*y* if $y_{ts}^-$ is greater than the voltage represented by Bit 4 of the binary representation of the reference voltage. If the lumped connection resistance Rcy is the same as the entire touch screen resistance Rtsy, then:

$$y_{ts^-} = \frac{1024}{5k\Omega + 5k\Omega + 480\Omega} \times 480 \approx 47LSB. \qquad \text{Equation (3)}$$

Whenever Bit 4 of ADC 22 changes to "0", this indicates that the lumped connection resistance Rcy is greater than 5 kilohms, and this can be taken to indicate inadequate connectivity of screen 31 to at least one of driver transistor 20, driver transistor 21, and test transistor 28*y* for Rc≧5 kilohms. (The equation for $x_{ts}^-$ in subsequently described FIG. 3 is essentially the same as the equation for $y_{ts}^-$, and therefore is not repeated.)

The following stored look-up table is chosen to indicate a more detailed selection of test bit register values which can be provided to provide test bits or reference values for self-testing of various touch screens.

TABLE 1

Touch Screen Selection and Test Bit Register Setup for Connectivity Test

| Decoded Test Register Bits | | | | | | | | | |
|---|---|---|---|---|---|---|---|---|---|
| 1 | 2 | 3 | 4 | 5 | 6 | 7 | 8 | 9 | Rtsy (kohms) |
| 1 | 0 | 0 | 0 | 0 | 0 | 0 | 0 | 0 | 0.17 |
| 0 | 1 | 1 | 0 | 0 | 0 | 0 | 0 | 0 | 0.17 < Rts <= 0.52 |
| 0 | 1 | 0 | 0 | 0 | 0 | 0 | 0 | 0 | 0.52 < Rts <= 0.86 |
| 0 | 0 | 1 | 1 | 0 | 0 | 0 | 0 | 0 | 0.86 < Rts <= 1.6 |
| 0 | 0 | 1 | 0 | 0 | 0 | 0 | 0 | 0 | 1.6 < Rts <= 2.2 |
| 0 | 0 | 0 | 1 | 1 | 0 | 0 | 0 | 0 | 2.2 < Rts <= 3.6 |
| 0 | 0 | 0 | 1 | 0 | 0 | 0 | 0 | 0 | 3.6 < Rts <= 5.0 |
| 0 | 0 | 0 | 0 | 1 | 1 | 0 | 0 | 0 | 5.0 < Rts <= 7.8 |
| 0 | 0 | 0 | 0 | 1 | 0 | 0 | 0 | 0 | 7.8 < Rts <= 10.5 |
| 0 | 0 | 0 | 0 | 0 | 1 | 1 | 0 | 0 | 10.5 < Rts <= 16.0 |
| 0 | 0 | 0 | 0 | 0 | 1 | 0 | 0 | 0 | 16.0 < Rts <= 21.6 |
| 0 | 0 | 0 | 0 | 0 | 0 | 1 | 1 | 0 | 21.6 < Rts <= 32.6 |
| 0 | 0 | 0 | 0 | 0 | 0 | 1 | 0 | 0 | 32.6 < Rts <= 43.6 |
| 0 | 0 | 0 | 0 | 0 | 0 | 0 | 1 | 1 | 43.6 < Rts <= 65.7 |
| 0 | 0 | 0 | 0 | 0 | 0 | 0 | 1 | 0 | 65.7 < Rts <= 87.8 |

A useful rule of thumb is to choose the test bit(s) for a particular touch screen when its entire resistance Rtsy is selected as the limiting upper value for the corresponding total connection resistance Rcy for that screen, so the connectivity test is failed if Rcy≧Rts, where Rts can be either Rtsx or Rtsy of subsequently described FIG. 3.

The test bit is just a particular bit of ADC 22. If the test voltage value produced by ADC 22 reads out larger than the value of the decoded test bit, that means the connectivity of the touch screen 31 to the touch screen controller is acceptable, so the self-test result is "pass".

Table 1 includes only the test system bits for testing connectivity, but does not include test bits for testing a short circuit due to warping of one or both of resistive screens 30 and 31 in subsequently described FIG. 3. Operation of the self-test circuitry to test for such short circuits involves turning on different driver transistors then is the case for self-testing for excessive connection resistance Rcx and Rcy. The table of test bits for self-testing for such short circuits is similar to Table 1, but merely consists of all "1"s, and therefore is not shown.

Figure 3:
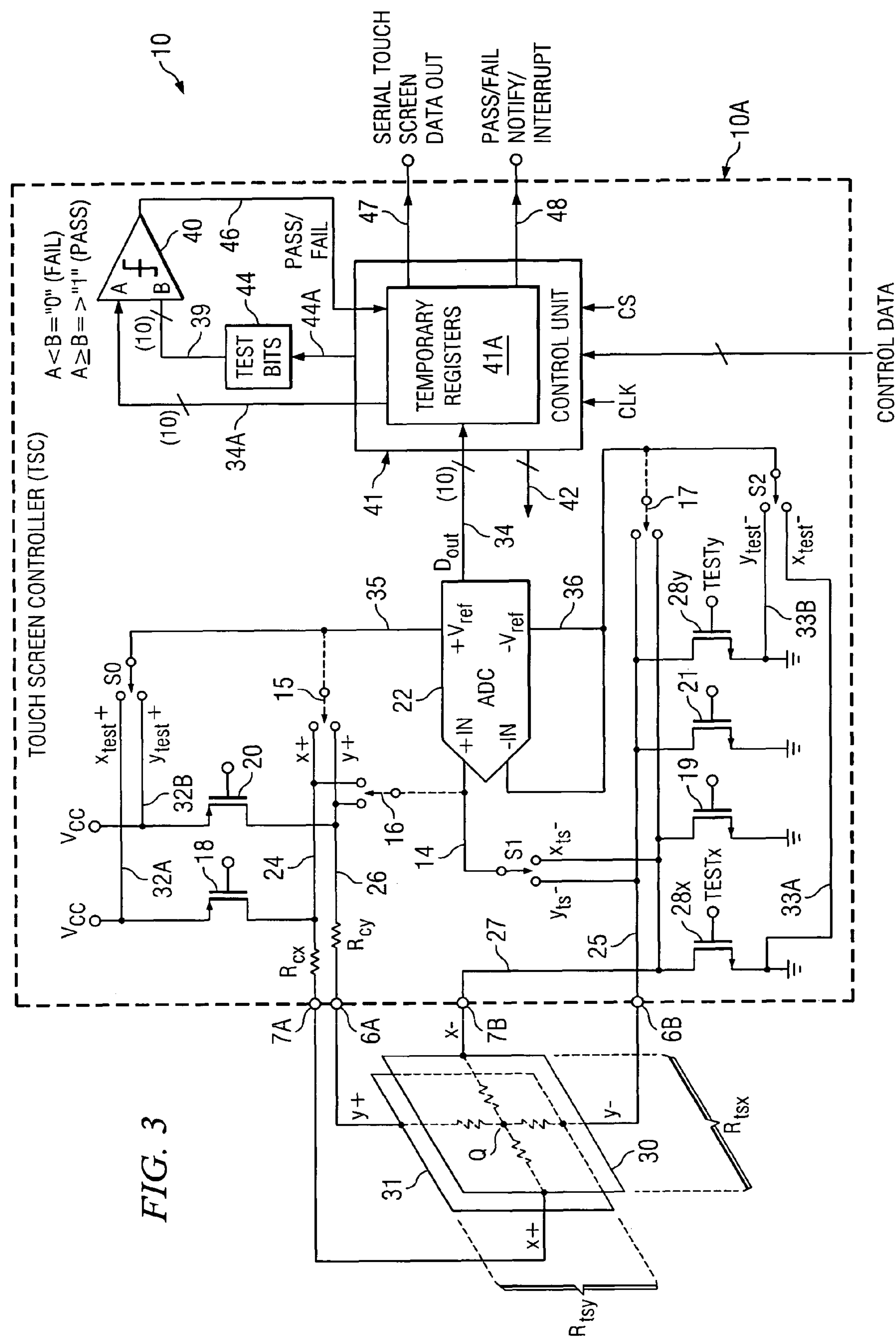
FIG. 3 is a more detailed schematic diagram of a preferred embodiment of the present invention.

Referring now to FIG. 3, touch screen digitizing system 10 includes a conventional analog resistive touch screen assembly 30,31 including a resistive "x screen" 30 having an x+ terminal connected by a connection pad 7A to conductor 24 and an x− terminal connected by connection pad 7B to conductor 27. Touch screen 30,31 also includes resistive "y screen" 31 parallel and very close to x screen 30. Resistive y screen 31 has a y+ terminal connected by connection pad 6A to conductor 26 and a y− terminal connected by connection pad 6B to conductor 25. (The x axis of x screen 30 is orthogonal to the y axis of y screen 31. Any "touch point" Q at which the pressure of a stylus or the like causes x screen 30 to touch and make electrical contact to y screen 31 modifies the resistances of screens 30 and 31 such that their respective terminal voltages represent the x and y coordinates of the touch point Q.)

The maximum connection resistance Rtsy as shown in FIG. 3 for y screen 31 (with no touch point depressed) is the same as in the diagram of FIG. 2, and similarly, the maximum connection resistance Rtsx for x screen 30 is the resistance between the terminals of screen 30 with no touch point depressed. In FIG. 3, Rcx is equal to the lumped connection pad resistance for connections of "x" resistive screen 30 to touch screen controller chip 10A through connection pads 7A and 7B, and Rcy is equal to the lumped connection pad resistance for connections of "y" resistive screen 31 to touch screen controller chip 10A through connection pads 6A and 6B.

P-channel driver transistor 18 has its drain connected to conductor 24, its gate connected to one o the f conductors 42 of a control unit 41, and its source connected to both $V_{CC}$ and conductor 32A to one terminal of double-throw, single-pole switch S0. The pole terminal of switch S0 is connected by conductor 35 to the $V_{REF}^+$ reference terminal of ADC 22. Similarly, P-channel driver transistor 20 has its drain connected to conductor 26, its gate connected to another one of conductors 42 of a control unit 41, and its source connected to $V_{CC}$ and also coupled by conductor 32B to another terminal of double-throw, single-pole switch S0. (Conductor 24 also is connected to one terminal of double-pole, single-throw switch 15, the pole terminal of which is connected to conductor 35. Conductor 26 also is connected to another terminal of switch 15. Conductor 24 also is connected to one terminal of double-pole, single-throw switch 16, the pole terminal of which is connected by conductor 14 to the (+) input of ADC 22. Similarly, conductor 26 is connected to another terminal of switch 16. The connections of switches 15 and 16 are shown in dashed lines because they is not used as part of the self-test circuitry and method of the present invention, but they are present and are used in the normal touch screen system operation for digitizing the coordinates of a touch point Q as described in above mentioned U.S. Pat. No. 6,246,394.)

Conductor 25 is connected to the drain of N-channel driver transistor 21, the gate of which is connected to one of conductors 42 of control unit 41, and the source of which is connected to ground. Conductor 25 also is connected to one terminal of double-pole, single-throw switch S1, the pole terminal of which is connected to conductor 14, and also is connected to one terminal of double-throw, single-pole switch 17, the pole terminal of which is connected by conductor 36 to the (−) input of ADC 22 and the $V_{REF}^-$ reference terminal of ADC 22. (Switch 17 and its connections are shown in dashed lines because it is used only in the digitizing of a touch point Q.) Conductor 25 also is connected to the drain of N-channel test transistor 28_y_, the gate of which is connected to receive a signal TESTy produced on one of conductors 42 by control unit 41. The source of test transistor 28_y_ is connected to ground and is also connected by conductor 33B to one terminal of double-throw, single-pole switch S2, the pole terminal of which is connected to conductor 36.

Similarly, conductor 27 is connected to the drain of N-channel driver transistor 19, the gate of which is connected to one of conductors 42 of control unit 41, and the source of which is connected to ground. Conductor 27 also is connected to another terminal of double-pole, single-throw switch S1, and also is connected to another terminal of double-pole, single-throw switch 17. Conductor 27 also is connected to the drain of N-channel test transistor 28_x_, the gate of which is connected to receive a signal TESTx produced on one of conductors 42 by control unit 41. The source of test transistor 28_x_ is connected to ground and is also connected by conductor 33A to another terminal of double-throw, single-pole switch S2.

Switches S0, S1 and S2 are used only for the purpose of automatic self-testing of the resistive screens 30 and 31 and their respective connections to the touch screen controller chip 10A. (An external host processor (not shown) can generate the command CONTROL DATA as an input to the control block 41 to initiate the self-test operation. Block 41 also includes the self-test circuitry for implementing the self-test algorithms of subsequently described FIG. 4 and/or subsequently described FIG. 5.)

The connection pad resistances Rcx and Rcy can vary considerably, and can be large enough in magnitude to prevent the full scale analog output voltages resulting from any touch point Q located at maximum x and y coordinates of screens 30 and 31 from being applied to the $V_{REF}^+$ and $V_{REF}^-$ reference terminals of ADC 22. The self-test circuitry and method of the present invention thus automatically determine and indicate to the user whether touch screen system 10 of FIG. 3 passes or fails one or both of the self-test procedures (which are based, in effect, on a comparison of the maximum screen resistance Rtsx with the lumped connection pad resistance Rcx and a comparison of the maximum screen resistance Rtsy with the lumped connection pad resistance Rcy) and to the self-test procedure for detecting a short circuit between resistive screens 30 and 31.

In response to a self-test command in the control data word CONTROL DATA, control unit 41 generates the necessary gate control voltages for control driver transistors 18, 19, 20 and 21 and also generates test control signals TESTx and TESTy to control test transistors 28_x_ and 28_y_, respectively, and also generates signals necessary to control self-test switches S0, S1, and S2 and turn off digitizing switches 15, 16, and 17 as needed during self-test operation. This can result in energizing one, and then, if necessary, the other of resistive screens 30 and 31 and measurement of test signals $y_{ts}^-$ or $y_{ts}^+$ by means of ADC 22 in order to digitize the measured test signals as indicated in subsequently described FIG. 4. This also can result in connecting resistive screens 30 and 31 to ADC 22 in such a way as to digitize the resulting measured test signals as indicated in subsequently described FIG. 5.

ADC 22 can (for example) be a conventional 10-bit successive approximation register (SAR) ADC having a CDAC architecture that inherently includes a sample/hold function with a synchronous serial interface. The portion of the touch screen digitizing system illustrated in FIG. 3 devoted to normal touch screen system operation is embodied in the assignee's ADS7843 touch screen controller product, and is generally described in above mentioned U.S. Pat. No. 6,246,394.

The 10-bit digital output 34 of ADC 22 is applied to the input of temporary register circuitry 41A which is included in control unit 41. Temporary register circuitry 41A temporarily stores a digitized 10-bit representation of each measurement of test voltages $y_{ts}^+$ and $y_{ts}^-$ and applies it via conductors 34A to a corresponding 10-bit input of a conventional digital comparator 40. Another 10-bit input of digital comparator 40 is coupled by conductors 39 to corresponding bits of test bit unit 44, which stores decoded information, e.g., the information in Table 1 for self-testing of connectivity and/or information in another table similar to Table 1 but consisting of all "1"s for self-testing for short-circuits between resistive screens 30 and 31. Control unit 41 also includes bit-setting/selection logic circuitry (not shown) coupled to test bit register 44 by means of bus 44A to allow the user to set and select test bits in test bit register 44. The decoded information in test bit register 44 can represent various 10-bit reference numbers which are selectable by the user and which are compared with the 10-bit representations of the measured test voltages $x_{ts}^-$ and $y_{ts}^-$ to determine if the lumped connection pad resistances Rcx and Rcy for the touch screen system 10 under test have the needed relationships to the maximum screen resistances Rtsx and Rtsy in accordance with the previously described equations in order that the digitized data output representing the location of touch point Q during normal operation can have the needed accuracy. Decoded information in test bit register 44 also can represent various 10-bit reference numbers which are selectable by the user and which are compared with the 10-bit representations of the measured test voltages $x_{ts}^-$ and $y_{ts}^-$ to determine if there is a short circuit between resistive screens 30 and 31 of the touch screen system 10 under test.

The output 46 of digital comparator 40 produces a "0" signal on conductor 46 if the measured binary test results are less than the binary reference number from bit test unit 44 so as to indicate that the touch screen system 10 being tested has failed and produces a "1" signal if the measured binary test results are greater s than the binary reference number from bit test unit 44 so as to indicate that the touch screen system 10 being tested has passed the self-test procedure. Temporary register circuitry 41A also includes a bit which stores the pass/fail information and outputs it via conductor 48 to inform the user. This output typically would be used as an interrupt to whatever host processor is being used to initiate the self-test operation. A serial data output 47 is utilized to serially output the digitized coordinates of the touch point Q during normal touch screen digitizing operation.

Control unit 41 includes logic circuitry which can be readily implemented by those skilled in the art to accomplish the above described self-testing procedure in accordance with the flowcharts of FIG. 4 and/or FIG. 5.

Referring first to FIG. 4, the starting point 55 of the self-test procedure for excessive connection resistance occurs in response to a self-test command from a host processor (not shown) applied to the CONTROL DATA input of control unit 41. As indicated in block 56 in FIG. 4, control unit 41 operates to either (1) energize x screen 30 by turning on driver transistor 18 and test transistor 28*x* and then actuating switch S0 to couple it conductor 32A and actuating switch S2 to couple it to conductor 33A, and actuating switch S1 to couple it to conductor 27 to measure the resulting test voltage $x_{ts}^-$, or (2) energize y screen 31 by turning on driver transistor 20 and test transistor 28*y* and actuating switch S0 to couple it conductor 32B and actuating switch S2 to couple it to conductor 33B, and then actuating switch S1 to couple it to conductor 25 to measure the resulting test voltage $y_{ts}^-$.

Next, control unit 41 provides a suitable signal stabilization delay before beginning the ADC conversion, as indicated in block 57. Then, as indicated in block 58, ADC 22 is operated to convert the appropriate test voltage, either $x_{ts}^-$ or $y_{ts}^-$, to a corresponding 10-bit digital number. The 10-bit digital number is transferred via ADC output bus 34 and temporally stored in temporary register circuitry 41A, as indicated in block 59. That 10-bit test voltage measurement binary value and then is applied via 10-conductor bus 34A to one input of digital comparator 40, and thereby is compared with the 10-bit decoded reference value selected by the user from the values available in test bit register 44, as indicated in decision block 60. If the resulting determination is that the value of the 10-bit test measurement voltage $x_{ts}^-$ or $y_{ts}^-$ is less than the value of the test bit reference number from test bit register 44, the touch screen system 10 under test fails the self-test procedure and control unit 41 goes into an idle mode, as indicated by label 61. If the resulting determination is that the value of the 10-bit test measurement voltage $x_{ts}^-$ or $y_{ts}^-$ is greater than the value of the test bit reference number from test bit register 44, then the touch screen system 10 under test passes the self-test procedure and control unit 41 goes into normal touch screen digitizing mode after exiting the self-test mode, as indicated by label 62. As a practical matter, a number of test voltage measurements of each of $x_{ts}^-$ and $y_{ts}^-$ are measured and averaged during each self-test procedure in order to filter out noise. The filtered result is what is compared to the 10-bit reference number from test bit register 44 to determine if the connectivity test has been passed by the touch screen system 10 being tested.

Referring next to FIG. 5, the starting point 55A of the self-test procedure for a short circuit between resistive screens 30 and 31 occurs in response to a self-test command from the host processor applied to the CONTROL DATA input of control unit 41. As indicated in block 56A in FIG. 4, control unit 41 operates to, for example, turn on transistors 20 and 28*x* (or transistors 18 and 28*y*) and switches S0 and S2 and also switch S1 (or switch 16) to couple it to conductor 27 to produce a resulting test voltage $x_{ts}^-$ on conductor 27 indicative of whether there is a short circuit between resistive screens 30 and 31.

Next, control unit 41 provides a suitable signal stabilization delay before beginning the ADC conversion, as indicated in block 57A. Then, as indicated in block 58A, ADC 22 is operated to convert the test voltage Xts− to a corresponding 10-bit digital number. The 10-bit digital number is transferred via ADC output bus 34 and temporally stored in temporary register circuitry 41A, as indicated in block 59A. The logical complement of that 10-bit test voltage measurement binary value then is applied via 10-conductor bus 34A to one input of digital comparator 40, and thereby is compared with the appropriate 10-bit decoded reference value selected by the user from the values available in test bit register 44, as indicated in decision block 60A. If the resulting determination is that the value of the logical complement of the 10-bit test measurement voltage Xts− is less than the value of the test bit reference number from test bit register 44, the touch screen system 10 under test fails the self-test procedure and control unit 41 goes into an idle mode, as indicated by label 61A. If the resulting determination is that the value of the logical complement of the 10-bit test measurement voltage Xts− is greater than the value of the test bit reference number from test bit register 44, then the touch screen system 10 under test passes the self-test procedure and control unit 41 goes into normal touch screen digitizing mode after exiting the self-test mode, as indicated by label 62A. As a practical matter, a number of test voltage measurements of each of Xts− are measured and averaged during each self-test procedure in order to filter out noise. The logical complement of the filtered result is what is compared to the 10-bit reference number from test bit register 44 to determine if the short-circuit test has been passed by the touch screen system 10 being tested. (It should be noted that the foregoing self-test procedure to determine whether there is a short circuit can be performed in various other entirely eco-locked ways. For example, transistors 18 and 28*y* can be turned on instead of transistors 20 and 28*x*, and the voltage on conductor 24 can be measured using switch 16 instead of using switch S1 to measure the voltage on conductor 27.

An important difference between the present invention and the prior art is that the invention re-utilizes the on-chip ADC and associated logic circuitry (along with additional logic circuitry including self-test control circuitry in control unit 41, test bit register circuitry 44, and comparator 40) to automatically self-test the connectivity of the resistive screens of the touch screen panel connected to the touch screen controller, rather than requiring the testing to be performed by the user or the user system.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. Of course, ADC 22 can have a different resolution than the 10 bits described above. If the connections between the test screen assembly 30,31 and the test screen controller 10A are highly reliable, it may be acceptable to self-test only for short-circuits between the two resistive screens, and conversely, if the reliability of the test screen assembly 30,31 is very high, it may be acceptable to self-test only for excessively high connection resistances Rcx and Rcy. Also, it should be appreciated that switch S0 is needed only if the difference in the values of $V_{CC}$ at the sources of driver transistors 18 and 20 is significant, and if the difference is not significant, then the $V_{REF}^{+}$ terminal of ADC 22 can be connected directly to $V_{CC}$. Similarly, switch S2 is needed only if the difference in the values of ground at the sources of transistors 28$x$ and 28$y$ is significant, and if the difference is not significant, then the $V_{REF}^{-}$ terminal of ADC 22 can be connected directly to ground.

What is claimed is:

1. A touch screen digitizing system including a touch screen assembly including a first resistive screen with opposed first and second terminals and a second resistive screen with opposed third and fourth terminals, and a touch screen controller circuit including an analog-to-digital converter (ADC) having first and second reference terminals, the improvement including self-test circuitry comprising:

a first driver switch coupled between a first reference voltage and the first terminal, and a first test switch coupled between a second reference voltage and a first conductor connected to the second terminal to generate a test voltage on the first conductor indicative of the presence of any short circuit connection between the first and second resistive screens;

means for coupling the first reference voltage to the first reference terminal of the ADC, and means for coupling the second reference voltage to the second reference terminal of the ADC;

a second test switch having a first terminal connected to the first conductor and a second terminal coupled to an input of the ADC for coupling the test voltage to the input of the ADC; and a comparator having a first input coupled to receive an output of the ADC representative of the test voltage and a second input coupled to receive a predetermined reference signal for producing a pass/fail signal indicative of whether or not a short circuit exists between the first and second resistive screens, wherein the first input of the comparator receives a logical complement of the output of the ADC representative of the test voltage.

2. An apparatus comprising:

an ADC having a first reference terminal, a second reference terminal, an input terminal, and an output terminal;

a first touch screen controller terminal;

a second touch screen controller terminal;

a first switch that is coupled to the first touch screen controller terminal and that receives a first voltage;

a second switch that is coupled to the second touch screen controller terminal and that receives a second voltage, wherein the second switch generates a test voltage that is indicative of a short circuit between the first and second touch screen controller terminals;

a third switch that receives the first voltage and that is coupled to the first reference terminal of the ADC;

a fourth switch that receives the second voltage and that is coupled to the second reference terminal of the ADC;

a fifth switch that is coupled between the second touch screen controller terminal and the input terminal of the ADC;

a control unit that is coupled to the output terminal so as to receive an output signal that is representative of the test voltage from the ADC and that generates a logical complement of the output signal; and a comparator that is coupled to the control unit so as to compare the logical complement of the output signal to a reference signal to generate a pass/fail signal indicative of whether the short circuit between the first and second touch screen controller terminals exists.

3. The apparatus of claim 2, wherein the test voltage further comprises a first test voltage, and wherein the apparatus further comprises:

a third touch screen controller terminal;

a fourth touch screen controller terminal that is coupled to the fifth switch;

a sixth switch that receives the first voltage and that is coupled to the third touch screen controller terminal; and a seventh switch that is coupled is coupled to the fourth touch screen controller terminal and that receives the second voltage.

4. The apparatus of claim 3, the control unit further comprises a plurality of temporary registers.

5. The apparatus of claim 4, wherein the apparatus further comprises:

a first resistive screen that is coupled to the first and fourth touch screen controller terminals; and a second resistive screen that is coupled to the second and third touch screen controller terminals.

6. The apparatus of claim 5, wherein the first, second, sixth, and seventh switches are MOS transistors.

7. The apparatus of claim 6, wherein the second voltage is ground.

* * * * *